(12) United States Patent
Inge

(10) Patent No.: US 6,494,468 B1
(45) Date of Patent: Dec. 17, 2002

(54) SPORTS EQUIPMENT STORAGE DEVICE

(76) Inventor: Jerry Inge, 3514 E. Diamond Ave., Mesa, AZ (US) 85204

( * ) Notice: Subject to any disclaimer, the term of this patent is extended or adjusted under 35 U.S.C. 154(b) by 0 days.

(21) Appl. No.: 09/661,904

(22) Filed: Sep. 14, 2000

Related U.S. Application Data

(60) Provisional application No. 60/154,949, filed on Sep. 21, 1999.

(51) Int. Cl.7 .................................................. B62B 3/04
(52) U.S. Cl. ................................ 280/47.35; 280/47.26; 224/919; 220/532; 206/315.1
(58) Field of Search ........................ 280/47.17, 47.18, 280/47.19, 47.24, 47.26, 47.34, 47.35, 79.2, 35, 651, 659; 224/919; 220/529, 532, 533, 521, 500; 206/315.9, 315.1

(56) References Cited

U.S. PATENT DOCUMENTS

| | | | | |
|---|---|---|---|---|
| 3,869,137 A | * | 3/1975 | Byrom ..................... 280/47.19 |
| 3,874,531 A | * | 4/1975 | Mayo .................. 280/47.35 X |
| 3,876,223 A | * | 4/1975 | O'Reilly et al. ......... 280/47.19 |
| 3,894,748 A | * | 7/1975 | Ratcliff ................ 280/47.35 X |
| 4,109,926 A | * | 8/1978 | Lane ................... 280/47.34 X |
| 4,418,930 A | * | 12/1983 | Ryan, Jr. .................. 290/47.19 |
| 4,968,048 A | | 11/1990 | Lortie ..................... 280/47.19 |
| 5,149,125 A | * | 9/1992 | Gray .......................... 280/651 |
| D338,306 S | | 8/1993 | White et al. ................. D34/24 |
| D340,565 S | | 10/1993 | Klopfenstein ................ D34/25 |
| 5,249,823 A | * | 10/1993 | McCoy et al. ............ 280/35 X |
| 5,273,298 A | | 12/1993 | Brown, Sr. ............... 280/47.19 |
| 5,351,976 A | * | 10/1994 | Penson .................... 280/47.35 |
| 5,465,988 A | * | 11/1995 | Dennis .................... 280/47.35 |
| 5,465,996 A | * | 11/1995 | Wisz .......................... 280/651 |
| 5,667,082 A | * | 9/1997 | Hamilton et al. .... 206/315.9 X |
| 5,702,140 A | * | 12/1997 | Radja ......................... 294/146 |
| 5,797,612 A | | 8/1998 | Buccioni ............. 280/47.19 X |
| D401,727 S | | 11/1998 | Weideman et al. .......... D34/25 |
| 5,876,047 A | * | 3/1999 | Dennis .................... 280/47.35 |

* cited by examiner

Primary Examiner—F. Zeender
(74) Attorney, Agent, or Firm—Patent Trademark Services; Joseph H. McGlynn

(57) ABSTRACT

A storage device for sports equipment having two containers which mount in a wagon and one of the containers has an adjustable cargo area and another of the containers has racks for holding baseballs and bats.

4 Claims, 1 Drawing Sheet

SPORTS EQUIPMENT STORAGE DEVICE

This is a conversion of Provisional application Ser. No. 60/154,949, filed Sep. 21, 1999.

BACKGROUND OF THE INVENTION

This invention relates, in general, to storage devices, and, in particular, to storage devices for sports equipment.

DESCRIPTION OF THE PRIOR ART

In the prior art various types of storage devices have been proposed. For example, U.S. Pat. No. 5,797,612 to Buccioni discloses a storage device for sports equipment with removable storage containers and a wheeled cart and the device has handles to assist loading the device onto the cart.

U.S. Pat. No. 5,273,298 to Brown discloses a wheeled container for sports equipment with storage compartments for balls and bats.

U.S. Pat. No. 4,968,048 to Lortie discloses a wheeled container for sports equipment with storage compartments for balls and bats.

U.S. Pat. No. Des. 401,727 to Weldeman et al discloses a wheeled container for sports equipment.

U.S. Pat. No. Des. 340,565 to Klopfenstein discloses a wheeled container for sports equipment.

U.S. Pat. No. Des. 338,306 to White et al discloses a wheelbarrow with removable dividers to adjust the storage compartment.

SUMMARY OF THE INVENTION

The present invention is directed to a storage device for sports equipment which mounts in a wagon and has an adjustable cargo area as well as racks for holding baseballs and bats.

It is an object of the present invention to provide a new and improved storage device for sports equipment.

It is an object of the present invention to provide a new and improved storage device for sports equipment which is inexpensive and easy to maneuver.

It is an object of the present invention to provide a new and improved storage device for sports equipment which can be adjusted to store different sizes of sports equipment.

These and other objects and advantages of the present invention will be fully apparent from the following description, when taken in connection with the annexed drawings.

DESCRIPTION OF THE PREFERRED EMBODIMENT

Figure 1:
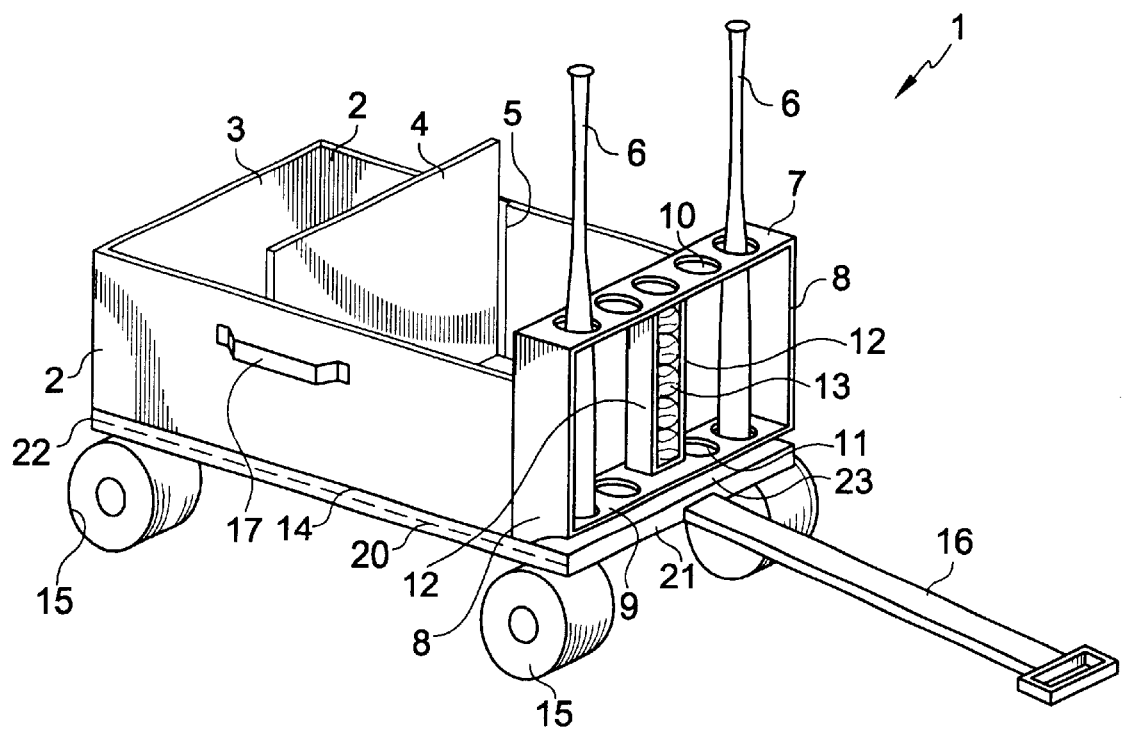
FIG. 1 is a perspective view of the present invention.

Referring now to the drawings in greater detail, FIG. 1 shows the storage device 1 of the present invention. The device as shown in FIG. 1 is set up to store and transport baseball equipment such as bats, balls, etc., however, it should be understood that the storage device could be adapted for other sports. The device comprises a container having a back 3, sides 2, a bottom 20 and a front. Each of the sides 2 have handles 17 which are designed so a user can either carry the whole device, or to allow a user to lift the container into and out of the wagon.

The wagon has sides 14, a back 22, front 21, and a bottom 23. The outside dimensions of the container will be sized so the sides of the container can fit within the sides of the wagon, and the bottom of the container can rest on the bottom of the wagon in order to easily transport the equipment in the container and to keep all of the equipment in one location.

As shown in FIG. 1, the container will not be as long as the length of the wagon so a second container for holding sports items such as bats and balls can fit within the wagon between the front of the container and the front of the wagon. It should be noted that the relative sizes of the first container, the second container, and the wagon can be varied to meet the needs of the user of the wagon without departing from the scope of the invention. For example, a user might want to carry equipment for football which might entail more equipment than for a sport such as baseball. In this case, the wagon could be made larger and the first and second container could be larger in order to accommodate the football equipment.

Figure 2:
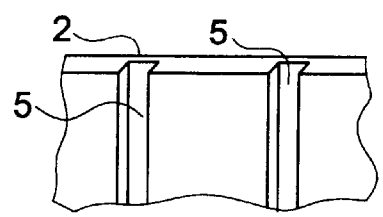
FIG. 2 is a partial view of one of the sides of the storage device of the present invention.

As shown in FIG. 1, and in the partial view of FIG. 2, the sides 2 of the first container have a plurality of grooves 5. The grooves 5 extend into both of the sides 2 and each groove on one side 2 is aligned with a corresponding groove on the opposite side 2 of the container. The grooves will receive a divider 4 which will divide the rear of the container into compartments for the storage of additional equipment. The divider 4 can fit with a friction fit within the grooves 5 and be held in place by gravity, or other fasteners could be used to secure the divider or dividers 4 in the sides 2 of the container.

It should be noted that while only one divider 4 is shown, additional dividers and additional grooves can be used to subdivide the rear of the wagon into one or more compartments for the storage of equipment. Again, the number of dividers 4 used, and the number of grooves 5 necessary to hold the dividers 4 will be determined by the amount of sports equipment that must be carried by the wagon, and the way the user desires the equipment to be separated or carried in the containers.

At the front of the first compartment 2, 3, 20 is a second compartment. The second compartment is removable from the wagon and is physically separate from the first compartment, although the user can have the two compartments made as a single piece if desired. Whether the containers are two separate pieces or a single piece would be determined, in part, by the type and amount of equipment that the user will carry in the containers.

The second compartment has sides 8, a top 7, and a bottom portion 9. The sides 8 and the bottom portion 9 will fit into the wagon similar to the sides 2 and the bottom 20 on the first compartment. The outside length of the first compartment and the outside length of the second compartment should be slightly less than the inside length of the wagon so the first and second compartments will fit easily into the wagon. This is important if the first and second containers are put into or taken out of the wagon while loaded with equipment.

The top 7 of the second container, as shown in FIG. 1, has a plurality of circular apertures 10 which extend completely through the top 7. The bottom portion 9 of the second container has a plurality of circular depressions 11 which align with the apertures 10 in the top 7 of the second container. As shown in FIG. 1, bats 6 can be passed through the apertures 10 in the top 7 of the second container with their handles up, and the top of the bats, i.e. the larger portion of the bats 6 can be passed through the apertures 10 and inserted into the depressions 11 to secure the bats in the second container. Obviously, the circular apertures 10 should have an inside dimension slightly larger than the largest bat that will be carried by the second container.

Figure 3:
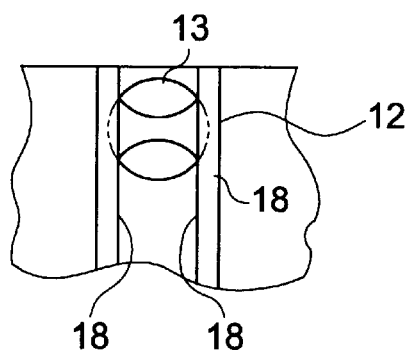
FIG. 3 is a front view of the ball storage section of the present invention.

The second container also has a compartment for storing balls 13. Referring to FIGS. 1 and 3, the ball compartment has sides 12 which extend from the top 7 of the second container to the bottom portion 9 of the second container. As shown in FIG. 3, each of the sides 12 has a lip 18, positioned at the front of the compartment for the balls, i.e. the portion of the ball compartment that is closest to the front of the wagon where the handle 16 is attached. The sides 12 of the ball compartment are spaced apart a distance that is larger than the balls 13 that will be placed in this portion of the second container, and the lips 18 are spaced apart a distance that is less than the diameter of the balls 13. In this manner, the balls 13 can be inserted through the aperture 10 in the top of the second container 7 directly over the ball storage portion and the lips 18 will prevent the balls from falling out the front of the ball storage compartment. Obviously, the dimensions of the ball storage compartment will be selected for the type of balls being used. That is, if baseballs will be stored in the ball storage compartment, the dimensions will be smaller than if softballs are being stored in the ball storage compartment. When a user wants to extract a ball, he/she merely has to pass their fingers through the front of the ball storage compartment and push up on the bottom of the ball and pass the ball up through the aperture 10 in the top 7 of the second compartment.

The wagon, which will be used to hold the first and second containers and transport the equipment stored in the first and second container has sides 14, a back 22, and a front 21. Wheels 15 are secured to the bottom 23 of the wagon by any conventional means in order to make it easy to transport the wagon, the first and second containers and the included sports equipment. In addition, the wagon is provided with a conventional pull handle 16 to make it easier to maneuver the wagon. The handle will be secured to the front of the wagon in a conventional manner and will serve the same function as any other wagon handle.

In order to use the present invention, a user would either load the first container with equipment such as, but not limited to, catcher's mask, chest protector, shin guards, gloves, etc, while the first container is outside the wagon and then lift the first container into the wagon, or he/she could fit the first container into the wagon before it is loaded with the above noted equipment. The divider or dividers 4 could be positioned within the first container in a way to conveniently separate the various types of equipment.

Next, the user would either load the second container outside the wagon and then lift it into the wagon, or he/she would fit the second container into the wagon and then load the second container.

When the user arrives at the location where the sports equipment will be used he/she could unload the equipment in the reverse order as explained above.

Although the Sports Equipment Storage Device and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A sports equipment storage device, said device comprising:

a first container having sides, a back, a front and a bottom, said first container having at least a pair of grooves with one of said pair of grooves being positioned in each of said sides, said grooves being positioned in said sides so said grooves are aligned with each other, a divider having a top, bottom, sides and a first and second surface, said sides of said divider being engaged with said grooves to secure said divider in a first compartment and to subdivide said first compartment into multiple compartments, a second container, said second container having sides, a top and a bottom, said top of said second container having a plurality of apertures extending therethrough, said bottom of said second container having a plurality of depressions therein which do not extend through said bottom of said second container, and wherein said second container has a compartment means for storing balls, said compartment means has sides, said sides extend from said top of said second container to said bottom of said second container, each of said sides has a lip, said sides being spaced apart a first distance, and said lips being spaced apart a second distance, and said first distance being greater than said second distance, the balls being accessible through the lips by a user.

2. The sports equipment storage device as claimed in claim 1, wherein said sides of said first container have handles thereon.

3. The sports equipment storage device as claimed in claim 1, in combination with a wagon, said wagon having sides, a back, a front and a bottom, and wheels attached to said bottom of said wagon, and a handle attached to said front of said wagon.

4. The sports equipment storage device as claimed in claim 3, wherein said sides of said first and second containers are spaced apart a first distance, and said sides of said wagon are spaced apart a second distance, and wherein said second distance is greater than said first distance.

* * * * *